INVENTORS
J. Huebler
D. Beggs
BY Charles J. Haughey
ATTORNEY

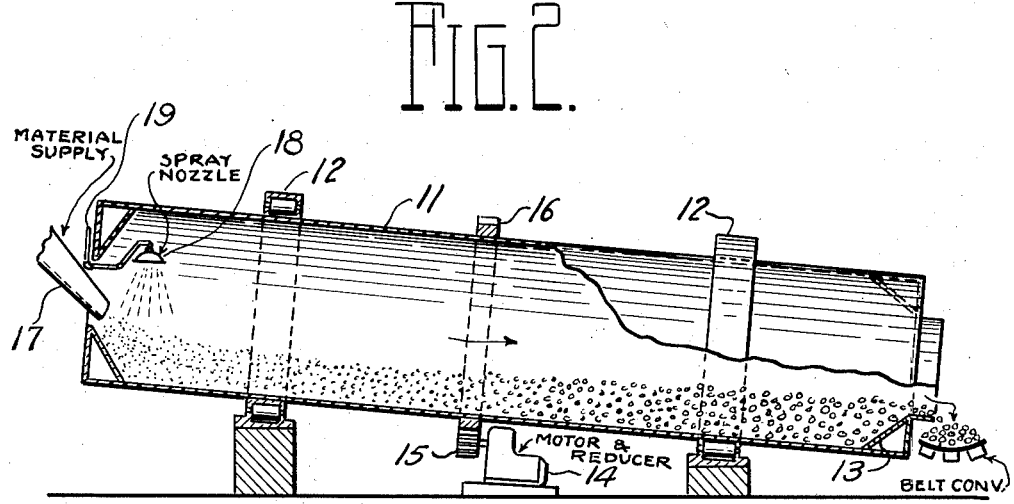
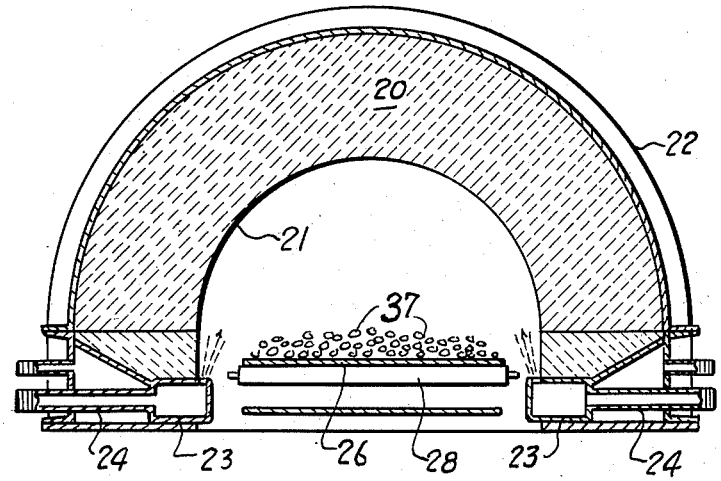

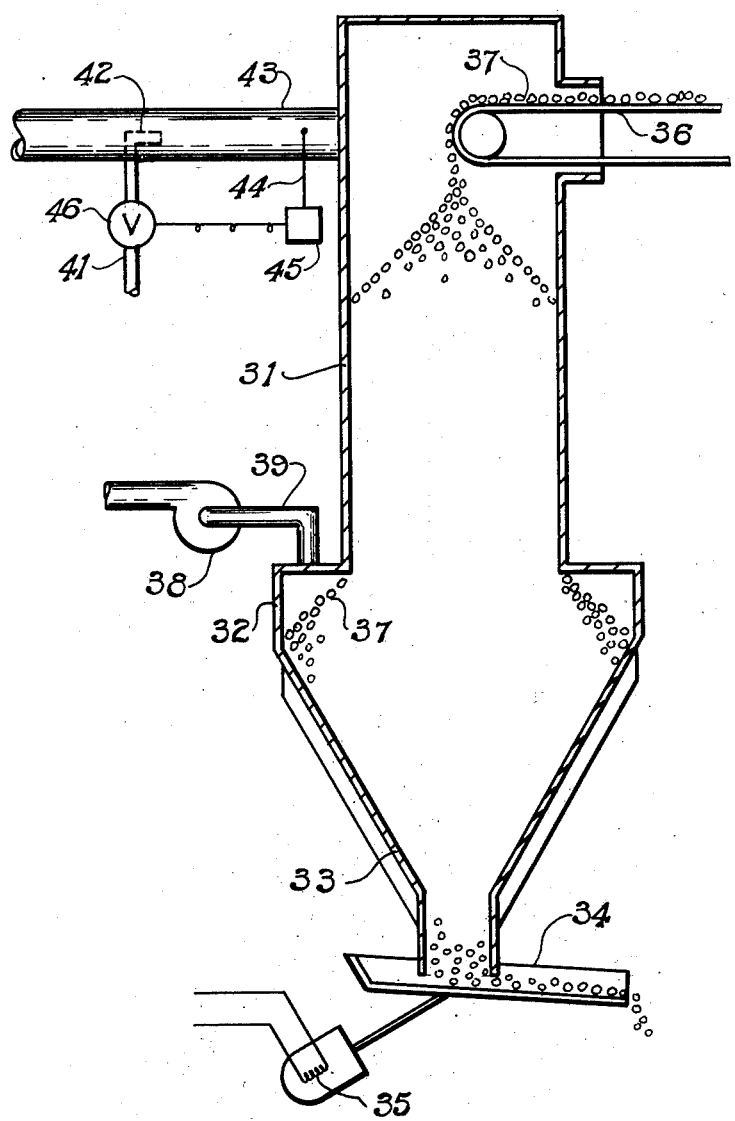

United States Patent Office 2,793,109
Patented May 21, 1957

2,793,109

INDURATION PROCESS FOR POWDERED IRON OXIDE CONTAINING MATERIAL

Jack Huebler, Sylvania, and Donald Beggs, Toledo, Ohio, assignors to Surface Combustion Corporation, Toledo, Ohio, a corporation of Ohio Application April 9, 1954, Serial No. 422,191

13 Claims. (Cl. 75—3)

This invention relates to a process for the induration of powdered iron oxide containing materials, and to such process wherein free iron for bonding of the powdered material in an agglomerated form in the presence of an accelerator suitable for charging to a furnace may be formed by reduction of iron oxide in a fast heating process in an external oxidizing atmosphere.

Various suggestions have heretofore been made for processing blast furnace flue dust, iron ore fines inadvertently formed in the course of mining and transporting, and mixtures of blast furnace flue dust and iron ore fines into a form suitable as a charge material for blast furnaces. For example, the admixture of iron powder, such as ground cast iron borings, with fine ores, coke, salts or like materials, moistening the resulting mixture with water, pressing into briquettes, and then allowing the iron powder to rust has been proposed, as well as a sintering operation which forms fine material into coherent masses usually after a preliminary briquetting, by heating to a relative high temperature, for example from about 2400° F. to about 2600° F. in order to form a mass sufficiently hard that it can be used as a blast furnace charge stock. The use of a rotating cylinder for forming ores into balls suitable for sintering is suggested generally in French Patent 458,066 (1913).

Certain difficulties inhere in the process for producing an agglomerated mass from such fine materials containing iron oxide, using any previously suggested process. For example, where free iron has been relied upon to form the bond, the cost thereof has been prohibitive, even though the least expensive sources were used, unless so small a portion of free iron were employed that the bond was too weak for practical use. Attempts to find inexpensive bonding materials for carrying out such agglomeration have failed to develop any that are both economically feasible and capable of producing a sufficiently strong bond. The most satisfactory known method, to the best of our knowledge, is the sintering method, which requires that all the fine material be heated to a temperature of at least about 2400° F., which is, in and of itself, an expensive procedure. However, the principal disadvantage of the sintering process arises when attempts are made to produce a blast furnace charge material from blast furnace flue dust. Blast furnace flue dust contains a substantial amount of coke, as well as limestone and the iron oxide itself. When a briquette, for example, of blast furnace flue dust is heated to effect sintering, the contained carbon therein reacts with oxygen from air which is blown past the briquette to form $CO_2$. Since this reaction is highly exothermic the carbon content of the briquette must be regulated within close limits, as too little carbon will yield an underheated, weak product, while too much will cause complete fusion. Thus, the operation of sintering requires constant analysis of the flue dust and careful admixture therewith of a carbon-free material such as iron ore fines. The sintered product is also highly fused to form iron silicate which is difficult to reduce in a blast furnace. In addition, the carbon is consumed during the sintering operation as fuel, and is consequently lost as a valuable reducing agent which might otherwise be used in the blast furnace.

The present invention is based upon the discovery of an inexpensive way for producing free iron suitable for admixture with blast furnace flue dust fines, iron ore fines, or mixtures of flue dust fines and iron ore fines, and an inexpensive way for agglomerating such admixture or a similar admixture to produce a material ideal, after induration, as a furnace charge.

It is, therefore, an object of the invention to provide a method for preparing free iron from particulate material containing iron oxide.

It is a further object of the invention to provide an improved method for producing an agglomerate suitable as a furnace charge from particulate material containing iron oxide.

Other objects and advantages of the invention will be apparent from the description which follows, reference being made to the attached drawings, wherein:

Fig. 2 is a vertical sectional view of a ball forming apparatus that has been used in carrying out an essential step in the process of the invention; and Fig. 3 is a simplified representation, in vertical section, of one particular furnace suitable for carrying out a portion of the process of the invention.

Fig. 4 is a vertical sectional representation of a shaft furnace for carrying out a portion of the process of the invention.

Figure 1:
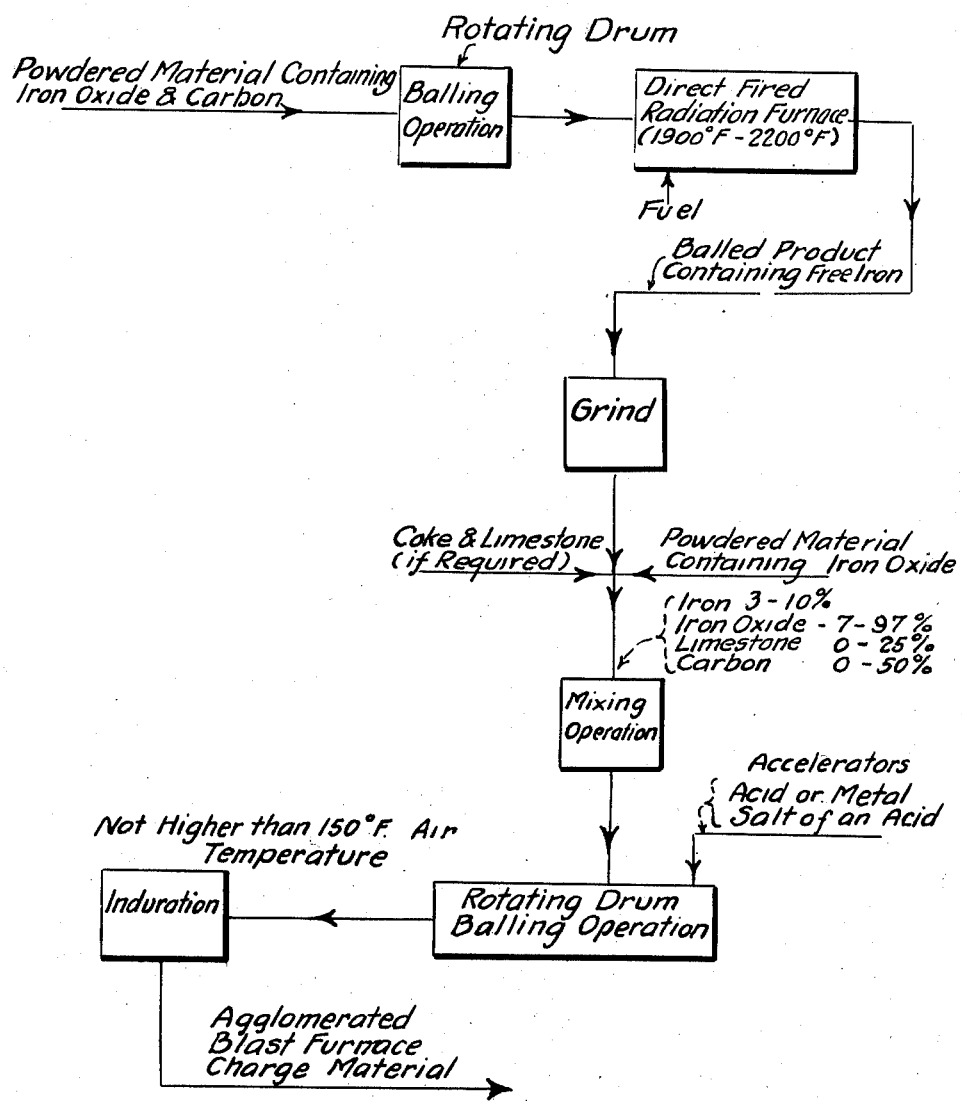
Fig. 1 is a schematic diagram in the nature of a flow sheet representing the various steps in one particular method according to the invention for producing an indurated furnace charge material from particulate material containing iron oxide.

According to the invention a method is provided for reducing oxidized iron contained in an agglomerated mass comprising iron in an oxidized form, calculated as $Fe_2O_3$, and carbon, in a weight ratio of from about 8:1 to about 1:1. The method consists in heating the agglomerated mass in an atmosphere substantially devoid of free oxygen at a rate such that the mass is at a temperature between about 1600° F. and 2200° F. for from about one minute to about twenty minutes. Heating at such rate can be accomplished by radiation from a hot body at a temperature of about 1900° F. to about 2200° F. The atmosphere substantially devoid of free oxygen in which the heating is carried out may contain substantial amounts of $CO_2$ and $H_2O$, and can, for example, be made up of products of combustion sometimes denominated "flue gas." Ordinarily there is no reason for using an atmosphere other than an oxygen free flue gas because the generation of such atmosphere is unnecessarily expensive. The use of an atmosphere comprising appreciable amounts of $CO_2$, $H_2O$ or $CO_2$ and $H_2O$ is especially advantageous, economically, because such an atmosphere is easily generated in maintaining the surface temperature of the desired heat radiating body.

According to a further aspect of the invention indurated material suitable for a furnace charge material is produced from an admixture of free-iron-containing material such as that produced as described above, and particulate material containing iron in an oxidized state, for example blast furnace dust, iron ore fines, or mixtures of blast furnace flue dust and iron ore fines. Such furnace charge material is produced by first grinding the agglomerated mass containing free iron described above, for example in a ball mill, and mixing the resulting ground product with the particulate material containing iron in an oxidized state to produce a composite particulate material containing from 3 percent to about 10 percent of free iron. At least about 20 percent of this material should be finer than 325 mesh, and substantially none should be coarser than about 10 mesh for best balling results. This composite material is then admixed with water and an accelerator and tumbled to produce mud-like balls containing from about 10 percent to about 20 percent of water and from about 0.2 percent to about 8 percent of the accelerator. The resulting mud-like balls are then subjected to the action of air or oxygen containing gas flowing in a parallel stream at an initial temperature not higher than 150° F. in order to accomplish induration. Counter flow of air and balls must be avoided to prevent "peaking" of the ball temperature, or excessive temperature rise of the balls, as will be described in detail.

The terms "percent" and "parts" are used herein, and in the appended claims, to refer to percent and parts by weight, unless otherwise indicated.

Mesh sizes of particulate material as used herein, and in the appended claims, refer to such sizes in the U. S. Sieve Series, unless otherwise indicated.

In general, virtually any particulate material containing iron in an oxidized state and carbon in the proportions indicated above can be used as a starting material for carrying out the iron reduction step of the invention. Naturally occurring and by-product materials are suitable for such use including chalybite, chamosite, goethite, limonite, magnetite, taconite, hematite and blast furnace flue dust. When blast furnace flue dust is used as the starting material at least a certain amount of carbon is automatically present therein. If desired, more carbon can be added, for example as carbon black, charcoal, coke, or even graphite, or the percentage of carbon can be decreased by admixture of iron ore fines with the flue dust.

Ordinarily, the precise ratio of iron in an oxidized state to carbon preferred for use in carrying out this process will depend upon economic considerations, and the ultimate end use contemplated for the final product containing free iron. For example, a particularly advantageous use for the resulting product, as is indicated above and hereinafter discussed in more detail, involves its admixture with another particulate material containing iron in an oxidized state and the production therefrom of blast furnace charge material. Many interrelated and independent factors will determine whether or not free carbon is desired in the finished product, even when intended for this use, and, if desired, to what extent. For example, it is entirely feasible to produce a complete blast furnace charge material, i. e., one containing the requisite proportionate amount of iron in oxidized state, carbon for reduction thereof, and slag forming material such as limestone, so that nothing in addition to this charge material need be added to a blast furnace to adjust the chemistry of the charge for the smelting operation. There should of course, be sufficient carbon to generate the required internal reducing atmosphere during the fast heating iron reduction process.

Whether or not there is free carbon associated with the reduced free iron in the product which results, and if so how much free carbon, depends upon the length of time that the agglomerated mass is maintained at a temperature above about 1200° F. and also upon the amount of carbon originally present in the agglomerated mass. When the ultimate use contemplated for the free iron-containing material is in the production of blast furnace charge material, the carbon content thereof may be adjusted so as to avoid the introduction of an excess of carbon into the ultimate product, but generally the charge material produced according to this process will be a supplemental charge for the furnace, and additional coke will be required for ore charged, as is usual. For most practical purposes it has been found to be preferred that the weight ratio of iron in oxidized state calculated as $Fe_2O_3$ to carbon be from about 1.6; 1 to about 3:1.

In addition to carbon and iron in oxidized state the particulate material used to form free iron can also contain various inert materials. The term "inert materials" in this sense, as used herein, refers to materials which neither liberate free oxygen nor interfere with the oxidation of carbon to form carbon monoxide, nor with the reduction of iron oxide by carbon monoxide as hereinafter set forth in more detail. Examples of such inert materials likely to be present in iron ore fines or in blast furnace flue dust include various clays, silica, mineral impurities, and limestone. As is mentioned above, taconite is a satisfactory source for iron in oxidized state for use in carrying out this operation; taconite contains about 60 percent of silica, so that it will be apparent that substantial amounts of such impurities can be tolerated. In fact, it has been found that as much as 90 percent of the entire particulate material so used can consist of impurities, only 10 percent being iron in oxidized state and carbon for the desired reaction. However, it is usually preferred that iron and carbon constitute at least 50 percent of the particulate material, and most preferred that they constitute at least 70 percent thereof, so that excessive fuel need not be expended to heat and cool inert materials in the free iron producing part of this process.

The particulate material containing iron in oxidized state and carbon can be agglomerated in any desired manner prior to carrying out the heating step according to the invention. For example, a briquetting technique well known to the art can be employed, or extrusion procedures are feasible. However, a most preferred way for forming the agglomerate involves the admixture with the particulate material, substantially all of which is finer than 10 mesh, and at least 20 percent of which is finer than about 325 mesh, with an amount of water sufficient to form a thick mud or paste, usually from about 10 percent to about 20 percent of water, and forming this mud into balls by a rolling or tumbling operation which can conveniently be carried out in a rotating drum such as that shown in Fig. 2 of the drawings. The rotating drum is merely a hollow cylindrical member 11 suitably journaled in bearings 12. A motor and reducer 14 drive a pinion 15, which in turn, drives a ring gear 16 attached to the drum 11. Iron oxide and carbon are introduced into the drum through a spout 17, and water through a nozzle 18, carried by a pipe 19. The drum 11 is mounted on a slightly inclined axis so that material charged into the lefthand open end thereof is simultaneously tumbled and moved toward the open righthand end against a baffle or lip 13. In the course of being simultaneously tumbled and moved through the drum, the material is formed into balls which are subjected to repeated high pressures by virtue of the tumbling so that each ball is formed into a tightly compacted mass before being discharged therefrom. It has been found that more efficient, and dense, compacting of the balls can be accomplished in this kind of apparatus, utilizing the tumbling principle, than in the usual briquetting or extrusion techniques. Such compacting is advantageous for the reason that it minimizes the difficulties of maintaining a localized atmosphere in situ within the balls in the course of the subsequent heating step hereinafter discussed in more detail.

It has been found that the size of balls produced in a balling drum is a function of the diameter of the cylindrical member in which the balling is carried out. A cylindrical member of larger diameter will more easily produce balls of larger diameter, and vice versa. In this connection, a cylinder having a diameter of about 2 feet has been used for the production of balls of a diameter of approximately 1 inch, usually ranging from a little less than ½ inch in diameter to about 1¼ inches in diameter. It is believed to be impractical to carry out the method of the invention using agglomerated particles having a minimum internal dimension less than about ¼ inch because of handling difficulties. Balls of larger diameter than 1¼ inch can be employed, if desired, a drum of larger diameter being preferred for their production. Ordinarily, for practical reasons, it is preferred to avoid the use of a drum having an excessive diameter, and, in consequence, it is also preferred to produce balls having a diameter not greater than about 3 inches. The most convenient ball size is approximately 1 inch, mean diameter, or a range from about ½ inch to about 1½ inches.

In carrying out the heating step to produce free iron from an agglomerated mass containing iron in an oxidized state, carbon, and, usually, some inert material, an atmosphere substantially devoid of free oxygen, but which may comprise water vapor and carbon dioxide, is essential. In the presence of $CO_2$ or $H_2O$ it is essential that the heating be accomplished at a very rapid rate, at least while the agglomerate is at a temperature above about 1200° F., the minimum temperature at which reaction between carbon and carbon dioxide proceeds at a substantial rate. Although it would be possible to carry out this reaction in an external reducing atmosphere without the need for rapid heating, no claim is made herein to any such process. Carrying out the reaction rapidy in an external atmosphere that may be oxidizing by virtue of the presence therein of carbon dioxide and water vapor makes possible the use of a direct fired furnace for this operation.

It will be apparent that, in an oxidizing atmosphere, reaction between water vapor, carbon and carbon dioxide would ultimately proceed to a point where all the carbon had been converted to carbon monoxide. The reaction involved in such oxidation of carbon is represented by Equations 1 and 2 below:

(1) $\quad C + H_2O \longrightarrow CO + H_2$
(2) $\quad C + CO_2 \longrightarrow 2CO$ Because of the large volume of gases passing through a direct fired furnace, for example, this reaction would ultimately proceed until all carbon in the agglomerate had been oxidized.

It is well known that other reactions will proceed at elevated temperatures between carbon monoxide, or hydrogen, and iron oxide, involving the oxidation of the carbon monoxide or hydrogen and reduction of the iron oxide. These reactions are represented by Equations 3 and 4 below, which show the reduction of $Fe_2O_3$, although they proceed equally well with $Fe_3O_4$ or $FeO$:

(3) $\quad 2Fe_2O_3 + 6CO \longrightarrow 4Fe + 6CO_2$
(4) $\quad Fe_2O_3 + 3H_2 \longrightarrow 2Fe + 3H_2O$ It has been found that by carrying out the extremely rapid heating of an agglomerated mass, as described above, in an atmosphere substantially devoid of free oxygen, comprising carbon dioxide and $H_2O$, the carbon monoxide and $H_2$ generated by the oxidation of carbon according to Equations 1 and 2 can be utilized in situ, inside the agglomerate, to carry out the reactions represented by Equations 3 and 4, thus producing free iron inside the agglomerate, even though external or furnace atmosphere would normally convert such free iron back to an oxidized state.

It has been found that the extremely rapid heating of an agglomerated mass necessary to produce free iron inside the agglomerate can be accomplished by passing the latter through a zone heated by a radiating body at a temperature between about 1900° F. and about 2200° F. It will be apparent that an accurate measurement of ball temperature under such heating conditions is virtually impossible. However, from a consideration of thermodynamic relationships, as interpreted in view of the experimental evidence, the time and temperature relationships hereinbefore discussed have been ascertained. In addition, it has been found that the reaction must be accomplished in from about 1 to 20 minutes. A longer time will consume the carbon, and a shorter time will not produce sufficient quantities of reduced iron. Preferably, the radiating surfaces are heated to a temperature from about 2000° F. to about 2100° F., and the reaction is accomplished in not more than about 10 minutes, most preferably in not more than about 5 minutes, and the balls are then rapidly cooled to stop the reaction. It will be apparent that radiant energy is highly advantageous for accomplishing heating at such high rates, and allowing an "atmosphere" gas to be generated within each ball.

One specific form of direct fired furnace particularly advantageous for carrying out such heating is shown in Fig. 3 of the attached drawings. The direct fired furnace comprises a radiating member 20 composed of a refractory, and having a radiating surface 21 that is generally semi-circular in cross section, and an outer shell 22. Manifolds 23 are operatively connected to gas conduits 24 to supply from a fuel source (not illustrated) a suitable combustible mixture. A belt conveyor 26 with agglomerated balls 37 shown positioned thereon is supported on rolls 28, and is movable in any suitable manner (not illustrated) through the furnace.

The following example is presented in order more fully to illustrate the reduction of iron in an agglomerate comprising iron in an oxidized state and carbon, but is in no way to be considered as a limitation upon the invention.

*Example 1*

A 10 pound charge of a blast furnace flue dust containing approximately 25 percent of carbon, 8 percent of limestone, and 62 percent of oxidized iron calculated as $Fe_2O_3$ was admixed with 2 pounds of water in a drum about 3 feet long and about 2 feet in diameter. The drum was then rotated at approximately 30 revolutions per minute for about 20 minutes, after which time tightly compacted mud balls of the flue dust were discharged from the drum and passed over a grizzly or screen through which balls having a diameter less than about ½ inch were able to pass. The materials which remained on top of the grizzly were then conveyed into a direct gas fired furnace having a radiating surface generally semi-cylindrical in cross section heated to a temperature of about 2000° F., and containing an atmosphere of about 71 percent by volume of nitrogen, 17 percent by volume $H_2O$, and 10 percent by volume carbon dioxide and one percent each of CO and $H_2$. The balls were heated in the furnace to a body temperature of about 1800° F. in approximately eight minutes, and were then discharged from the furnace and cooled rapidly. After cooling the balls were found to contain about 20 percent of carbon, 51 percent of free iron, and 1 percent of limestone, as well as about 12 percent of iron oxide calculated as $Fe_2O_3$.

Upon examination of a sectioned fired ball under a microscope it was found that a surface skin of the ball approximately 1/32 inch thick contained a substantially lower percentage of carbon and free iron, and a substantially higher percentage of iron oxide, while the portion of the ball interior of such surface skin contained a substantially higher percent of carbon and free iron.

Instead of blast furnace flue dust, a mixture of iron ore fines with carbon, most desirably coke breeze for economic reasons, a mixture of iron ore fines, carbon and flue dust, or a mixture of flue dust and carbon can be balled and fired as described above to produce free iron according to the invention.

The invention also contemplates a process for producing furnace charge material from such material as the product produced as described above containing free iron in intimate admixture with carbon, together with additional particulate material containing iron in an oxidized state. As a first step in producing such furnace charge material, the fired balls produced as described above are first ground to a particulate form, for example in a ball mill. If desired, the balls can first be crushed, for example in a moving jaw crusher, in order to simplify the grinding operation. The resulting ground material, which should contain no appreciable amount of material coarser than about 10 mesh, is then admixed with particulate material containing iron in an oxidized state in proportions such that the resulting admixture contains from about 3 percent to about 10 percent of free iron. Preferably, the resulting admixture contains from about 6 percent to about 8 percent, and most desirably about 7 percent of free iron. The resulting admixture should contain no material coarser than about 10 mesh, and should contain at least about 20 percent of material finer than 325 mesh for easier balling. It will be apparent that the particle size range sought is merely to facilitate the balling operation. The precise composition to be sought in this mixing operation will depend upon the contemplated use for the resulting product. For example, if the product is to be used as a complete blast furnace charge material, it should contain, in addition to free iron, from about 15 percent to about 40 percent of carbon, from about 11 percent to about 17 percent of limestone, balance iron oxides and impurities. If, on the other hand, the ball mill charge material is to be used in conjunction with iron ore, a substantially higher or lower percentage of carbon and limestone may be desirable. In general, this mixture can contain virtually no free carbon, or as much as about 50 percent, virtually no limestone, or as much as about 25 percent, and the indicated amount of free iron, the balance being iron oxides and impurities.

This admixture is then admitted to a rotating drum-type tumbler such as that shown in Fig. 2 of the drawings, and admixed with sufficient water and accelerator to produce a composition containing from about 10 percent to about 20 percent of water, and from about 0.2 percent to about 8 percent of accelerator. The water and accelerator are preferably added as a solution, and sprayed into the balling drum so that maximum benefit of the accelerator is obtained. The accelerator should preferably be dissolved only when in a ball so that such chemical action as takes place will contribute to the desired bonding of the ball.

In general, any acid or any metal salt of an acid can be used as an accelerator. Sulfuric acid, hydrochloric acid, nitric acid, acetic acid, ferrous sulphate, sodium chloride, magnesium chloride, potassium chloride and calcium chloride have all been employed. It has been found that when a metal salt of an acid is used, the percent thereof required to produce a result equivalent to that achieved by the use of the corresponding acid should be such as to introduce the same amount of negative acid radical into the composition as was introduced with the acid. For example, about 5 percent of calcium chloride as an accelerator is required to be approximately as effective as about 3¼ percent of HCl.

Spent pickle liquor from steel pickling tanks, in relatively large quantities, is available as a waste product in most locations where blast furnaces are operated. Extensive experimentation has indicated that this material makes an excellent accelerator for use in the process of the invention. It is ideal for this purpose, since it is virtually a free material, while an amount of calcium chloride, for example, required to achieve an equivalent result would cost approximately $1.25 per ton of particulate material formed into blast furnace charges.

The balling of the particulate material comprising free iron, iron in an oxidized state, water and accelerator is carried out in the same manner as that previously described in connection with the balling of material for use in the production of free iron, for example in the apparatus illustrated in Fig. 2. Although the balls can be produced in virtually any reasonable size desired, it has been found that those having a diameter of approximately 1 inch are ideal for use as a blast furnace charge, a preferred size range being from about ½ to about 1½ inches in diameter.

After the balls have been formed it is necessary that they be dried in air, or an oxygen containing atmosphere, in order to form an extremely hard, indurated product constituting an excellent furnace charge material.

It has been observed experimentally that, during the course of the drying operation, the temperature of the balls first decreases and then increases. Although the invention is not limited to the following theoretical discussion, it is believed that these temperature variations indicate the mechanism by which induration occurs in the process of the invention. The decrease in ball temperature is believed to occur because of the endothermic drying operation, namely, the physical evaporation of water from the balls, while the increase in temperature is believed to be caused by the exothermic oxidation of the free iron contained therein. The action of an accelerator of the class previously discussed in facilitating induration is attributed to the action either of the acid or of the metal salt of an acid as an electrolyte which tends to dissolve the free iron, or even iron oxidized to the ferrous state, and also to increase the mobility thereof, thus making possible a galvanic action between ferric oxide, and iron or ferrous oxide, in the presence of the electrolyte. This galvanic action is believed to result in the movement of atomic particles in the balls, which movement is thought to effect a bonding. Apparently this reaction proceeds only after a major portion of the water present in the balls has been evaporated, and is responsible for the temperature increase noted in the last stages of the drying operation. It is known, of course, that iron oxidizes more readily in solution than in solid form, and that such oxidation is exothermic.

The foregoing theoretical discussion explains the suitability of the class of accelerating agents discussed above as operable for facilitating induration according to the invention. It will be noted that ammonium salts of acids should be operable as electrolytes for carrying out the induration process, according to the above theory, but that such salts have been found to be unsatisfactory. It is believed that the evolution of $NH_3$ from such ammonium salts causes disintegration of the balls and is responsible for their unsatisfactory performance.

It has been found that if air at about 70° F. is passed downwardly through a downwardly moving bed of balls to be indurated, containing the requisite free iron, accelerator and water content, this being an example of parallel stream flow, there is a very small but measurable rise in air temperature and in ball, or stock, temperature through the bed as would be indicated by the theory suggested, this rise being of the order of 5° F. depending on relative rates of air flow and the humidity condition of the entering air.

When the entering air is at about 150° F., this temperature rise in the stock is of the order of 70° to 90° F., making a ball peak temperature of about 220° to 240° F. This produces a relatively weak product, or a poorly indurated ball, but yet a useable product if handled with some care. With 150° F. concurrently flowing air, a reaction time of about 1 hour is required for the drying and indurating step, at the end of which the balls have attained the hardness and the degree of dryness corresponding to the temperature of the entering air. When the balls are dry, the indurating stops. When air at about 120° F. is used in this drying operation, the drying time is about 2 hours, and no special care need be used in handling the product.

If 100° F. air is used in parallel stream flow, a considerably harder and more satisfactory product is obtained and an indurating time of about 4 hours is required. A moderate temperature use of the order of about 30° F. will occur in the stock. If this product is stored in the open, repeated wetting by accumulation of dew or rain and subsequent drying will actually further increase the strength of the product.

If 70° F. air at relatively low (less than 50 percent) humidity is used for parallel stream drying, the drying time increases to about 6 hours, and there is again a further increase of strength upon subsequent wetting and drying, even greater than in the 100° F. air dried product, but in each case the bond formed in the induration drying step is very adequate, and more superior at lower temperatures.

Since air temperatures below 32° F. will freeze the water in the balls, the reaction is apparently stopped, and at temperatures between 32° F. and 70° F. the drying time is so long as to be undesirable and excessive. Also, since the air must be sufficiently dry initially to absorb the moisture in the balls, it is preferred to use warmer air which usually is relatively dry. To insure warm, relatively dry air, an air heater may be utilized, either direct or indirect fired. It is apparent that ambient atmospheric air is generally very suitable for this drying step, especially if pre-warmed to about 70° F. to 120° F.

A shaft furnace suitable for the indurating step of this process is illustrated in Fig. 4. The furnace comprises a vertically walled portion 31, a bustle portion 32 and a converging discharge portion 33. A discharge device 34 of the vibration or reciprocating type, actuated by a motor element represented by a coil 35 is shown for providing a controlled rate of discharge of balled material from the furnace. Balls 37 from the balling drum are delivered to the top of the vertical walled portion 31 of the furnace by a belt conveyor 36. The height of the stock line of the balls will be maintained substantially constant by apparatus forming no part of this invention, hence not shown, suffice it to say that the feeder and discharge mechanisms are coordinated to that end.

The balls delivered to the shaft furnace will contain about 10% to 20% moisture, about 3% to 10% free iron, about .02% to 8% accelerator, a substantial portion of iron in an oxidized state, and inert material. To dry the balls, an exhaust 38 is connected to the bustle portion 32 by a pipe 39 and exhausts gases, primarily air, from the bed of pebbles; atmospheric air is generally adequate for this drying process, seldom being over 120° F. or 50% relative humidity, but since it sometimes becomes nearly saturated, as during a summer rain, and it sometimes is below freezing temperature, it is preferred to provide for supplying heated air, for the drying process. This may be done by an indirect heater or by a direct combustion heater, the latter of which is shown in Fig. 4 where a fuel pipe 41 delivers a burner mixture to a burner 42 in an air delivery pipe 43. A thermocouple 44 is provided downstream of the burner, and a control instrument 45 controls a valve 46 in pipe 41 responsive to the thermocouple to maintain the desired air temperature.

It has been found that while a parallel flowing air stream of 150° F. air will cause the stock temperature to rise about 70° F. or so, a countercurrent flowing stream of 150° F. air in a bed of such balls will cause the temperature to rise to a very high temperature peak which destroys the bond, and produces a worthless product. This peaking of temperature is characteristic of endothermic reactions in counter current flow, and in very efficient pebble heater type of apparatus such as is illustrated in Fig. 4, the effect is ruinous for this indurating process. While a cross flow of air over the balls would avoid this peaking phenomenon, it involves unnecessary handling problems, and allows too fast a reaction in the last stages of drying. In the parallel stream flow process, the initial evaporation of water so humidifies the air as to retard the later drying of the balls, thus slowing the portion of the drying cycle during which the strong bond is formed, and a stronger bond results with parallel stream flow than is attained with cross flow of air at the same initial temperature and relative humidity.

It will be appreciated that a sufficient volume should be passed through the bed of balls to exhaust therefrom at less than 100% relative humidity, especially for the later stages of drying, and an optimum rate of air flow is quite easily arrived at for any given drying load.

The following example is presented further to illustrate and disclose the method of producing a blast furnace charge material according to the invention, but is in no way to be construed as a limitation thereon.

*Example 2*

A ball mill was charged with a number of balls containing carbon, limestone and free iron produced as described in Example 1 and rotated until the balls were ground to an extent such that a powdered material having approximately the following screen analysis resulted:

| Mesh: | Percent |
|---|---|
| +20 | 1.86 |
| +40 | 6.50 |
| +80 | 22.14 |
| +100 | 9.40 |
| +200 | 35.82 |
| +325 | 15.06 |
| −325 | 9.20 |

This material was then blended with blast furnace flue dust containing approximately 15 percent of carbon, 67 percent of iron in an oxidized state calculated as $Fe_2O_3$, and 6 percent of limestone, and ground to approximately the following screen analysis:

| Mesh: | Percent |
|---|---|
| +20 | 0.02 |
| +40 | 0.14 |
| +80 | 2.40 |
| +100 | 2.36 |
| +200 | 19.28 |
| +325 | 25.87 |
| −325 | 49.93 |

A 30 pound portion of the resulting material, containing approximately 16 percent of carbon, 7 percent of free iron, 60 percent of iron oxide calculated as $Fe_2O_3$, and 10 percent of limestone was then charged into a drum having a diameter of about 2 feet and a length of about 3 feet. The drum was then rotated at about 30 revolutions per minute, while spent pickle liquor to the extent of about 0.5 gallon was added to the drum by spraying. The spent pickle liquor used was essentially an aqueous solution of sulphuric acid and ferrous sulphate of about 10 percent and 8 percent, concentration, respectively. The addition of spent pickle liquor to the drum required approximately 15 minutes. Rotation of the drum was continued for about 2 minutes after this addition had been completed. When the drum was stopped, the contents thereof were discharged onto a grizzly having openings of such size that balls smaller than about ½ inch in diameter passed through the openings and were returned as seed for subsequent balling operations. Balls having a diameter in excess of about ½ inch remained on top of the grizzly, and were charged into the top of a drying tower generally of cylindrical shape. The previously described operations were repeated to produce successive charges of balls for charging into the drying tower, and maintain the flow of balls therethrough continuously.

The drying tower had a diameter of about 1 foot and a vertical axial height of approximately 5 feet. Balls were charged to the upper end thereof, and removed from the lower end thereof at a rate of approximately 25 pounds per hour, while air at a temperature of about 80° F. having a relative humidity of approximately 20 percent was passed through the drying tower, in parallel flow to the balls, at a rate of about 3000 cubic feet per hour.

Balls removed from the bottom of the drying tower were found to be dry and extremely hard. They were tested for hardness by pouring from 40 to 50 pounds of balls through a 4 inch pipe mounted vertically and approximately 30 feet in length. Balls discharged from the lower end of this pipe were directed against a steel plate rigidly mounted so as not to deflect appreciably under the impact of the balls. The balls were then collected and subjected to this test four additional times. At the end of this test 95 percent of the material originally poured through the pipe was coarser than 10 mesh.

It has been found experimentally that, for optimum ball strength, the accelerator must be added during the course of the tumbling operation used to produce the balls, for example through the nozzle 18 in Fig. 2. When the accelerator is admixed with the granular material prior to balling, reaction begins to proceed in the finely divided state and goes to an extent such that additional reaction which occurs during and after balling is not sufficient to produce the strength required for some purposes. For this reason, briquetting, although sometimes satisfactory, is not an equivalent for the preferred balling operation in producing furnace charge material according to the invention.

It will be apparent that various changes and modifications can be made from the specific details of the process disclosed without departing from the spirit of the accompanying claims.

What we claim is:

1. A method for producing free iron from particulate material comprising oxidized iron calculated as $Fe_2O_3$ and carbon in a weight ratio from about 8:1 to about 1:1, a major portion of the particulate material being between about 10 mesh and 325 mesh, and a minor portion thereof being finer than 325 mesh, which comprises moistening the particulate material to produce a mud containing from about 10 percent to about 20 percent of water, forming the mud into an agglomerated mass, and heating the agglomerated mass in an oxidizing atmosphere substantially devoid of free oxygen to a temperature from about 1600° F. to about 2200° F., said heating being at such a rate that the agglomerated mass is at a temperature within such range from about one minute to about 20 minutes.

2. A method as claimed in claim 1 in which the mud is formed into a plurality of agglomerated masses having maximum and minimum dimensions from about 3 inches to about ½ inch, respectively, and in which the agglomerated masses are generally spherical in shape, and are formed by a tumbling step.

3. A method as claimed in claim 2 in which the diameters of the generally spherical agglomerated masses are from about ¾ of an inch to about 1½ inches.

4. A method for reducing oxidized iron contained in an agglomerated mass comprising oxidized iron calculated as $Fe_2O_3$ and carbon in a weight ratio from about 8:1 to about 1:1 which consists in heating the agglomerated mass in an oxidizing atmosphere substantially devoid of free oxygen to a temperature from about 2000° F. to about 2100° F., said heating being at such a rate that the agglomerated mass is at a temperature above 1600° F. for from about one minute to about 10 minutes.

5. A method for reducing oxidized iron contained in an agglomerated mass comprising oxidized iron calculated as $Fe_2O_3$ and carbon in a weight ratio from about 8:1 to about 1:1 which consists in heating the agglomerated mass in an oxidizing atmosphere substantially devoid of free oxygen to a temperature from about 1900° F. to about 2200° F., said heating being at such a rate that the agglomerated mass is at a temperature above 1600° F. for from about one minute to about 15 minutes.

6. A method for producing free iron which comprises balling a mixture containing particles of oxidized iron and of carbon and sufficient water to constitute a binder for the material and heating the balled material in an oxidizing external atmosphere substantially devoid of free oxygen to a temperature and for a time sufficient to react carbon in the balled material with combined oxygen in the iron oxide in the material to produce at least 3% reduced iron without softening and deforming the balled material, said heating being at a rate sufficient to generate within the balled material a reducing carbonaceous atmosphere at a rate sufficient to prevent substantial penetration into the balled material of the external atmosphere.

7. A method for producing balled furnace charge material which comprises balling a mixture of particles containing oxidized iron, free iron, an accelerator selected from the group consisting of acids and metal salts of acids and water to produce generally spherical balls, and air drying the balls at an air temperature between about 70° F. and about 120° F.

8. A method for producing furnace charge material from particulate material containing free iron and iron in an oxidized state, such material being substantially between 10 mesh and 325 mesh and containing a portion finer than 325 mesh, which comprises tumbling such material which includes from about 3 percent to about 10 percent of free iron in a balling drum in the presence of water and an accelerator selected from the group consisting of acids and metal salts of acids to produce generally spherical balls containing from about 10 percent to about 20 percent of water and from about 0.2 percent to about 8 percent of the accelerator, and air drying the resulting balls at a temperature less than 150° F.

9. A method for producing furnace charge material from particulate material containing free iron and iron in an oxidized state having a substantial portion less than 10 mesh and greater than 325 mesh and a minor portion finer than 325 mesh, which comprises balling such particulate material which includes from about 3 percent to about 10 percent of free iron in the presence of water and an accelerator selected from the group consisting of acids and metal salts of acids, and drying the resulting balls in a free oxygen containing substantially parallel flowing gas stream at less than 150° F. and more than 32° F.

10. A method for producing furnace charge material from ground material containing free iron and iron in an oxidized state, such material being substantially between 10 mesh and 325 mesh, which comprises tumbling such material which includes from about 3 percent to about 10 percent of free iron in a balling drum in the presence of an aqueous solution of an accelerator selected from the group consisting of acids and metal salts of acids to produce generally spherical balls containing from about 10 percent to about 20 percent of water and from about 0.2 percent to about 8 percent of the accelerator, and air drying the resulting balls by a parallel flow of air at a temperature not greater than about 120° F.

11. A method for producing furnace charge material, which comprises balling a mixture containing from about 3 percent to about 10 percent free iron, and iron oxide material in the presence of water and an accelerator selected from the group consisting of acids and metal salts of acids, and drying the balled material in a bed thereof in a shaft furnace by continuously supplying said balled material to the top of the bed, withdrawing dried balled material from the bottom of the bed, passing downward through the bed a stream of air initially at a temperature less than about 120° F. and more than about 70° F. and a relative humidity less than about 50 percent, and maintaining the balled material in the bed for a sufficient time to become substantially dry.

12. A method for producing furnace charge material which comprises balling a mixture of iron oxide material and free iron in the proportion of from about 3 percent to about 10 percent in the presence of water and an accelerator selected from the group consisting of acids and metal salts of acids, and drying the balled material in a shaft furnace by passing the balls downward through the furnace and passing a stream of air at a temperature below 150° F. downward through the bed at a rate to discharge the air from the balls in the furnace at less than 100 percent humidity.

13. In a method for producing furnace charge material which comprises agglomerating a mass of particulate material containing free iron, oxidized iron, water and an accelerator selected from the group consisting of acids and metal salts of acids and air drying the resulting agglomerated material at a temperature less than 150° F., the improvement which includes forming the free iron by heating an agglomerated mass comprising oxidized iron, carbon and sufficient water to constitute a binder for the material in an oxidizing external atmosphere substantially devoid of free oxygen to a temperature and for a time sufficient to react carbon in the agglomerated material with combined oxygen in the iron oxide to produce at least 3 percent of reduced iron without softening and deforming the agglomerated material, said heating being at a rate sufficient to generate within the agglomerated material a reducing carbonaceous atmosphere at a rate sufficient to prevent substantial penetration into the agglomerated material of the external atmosphere.

References Cited in the file of this patent
UNITED STATES PATENTS

| Number | Name | Date |
|---|---|---|
| 806,774 | Brown | Dec. 12, 1905 |
| 933,269 | Schumacher | Sept. 7, 1909 |
| 1,121,048 | Schumacher | Dec. 15, 1914 |
| 1,312,218 | Vogel | Aug. 5, 1919 |
| 1,536,032 | Stillman | Apr. 28, 1925 |
| 1,614,369 | Kippe | Jan. 11, 1927 |
| 1,848,710 | Gustafsson | Mar. 8, 1932 |
| 1,865,554 | Bradley | July 5, 1932 |
| 1,879,373 | McComb | Sept. 27, 1932 |
| 1,930,010 | Haswell et al. | Oct. 10, 1933 |
| 2,543,898 | De Vaney | Mar. 6, 1951 |
| 2,631,178 | Morton | Mar. 10, 1953 |
| 2,676,095 | De Vaney et al. | Apr. 20, 1954 |

OTHER REFERENCES

The Iron Age, June 11, 1942, pages 54–59.